United States Patent [19]
Vlad

[11] Patent Number: 5,975,227
[45] Date of Patent: Nov. 2, 1999

[54] DIESEL MOTOR-DRIVEN ELECTRIC DRIVE POWER TRAIN SYSTEM

[76] Inventor: Martin Vlad, 570 Sycamore Cir., San Bernadino, Calif. 92410

[21] Appl. No.: 08/804,835

[22] Filed: Feb. 24, 1997

[51] Int. Cl.$^6$ ..................................................... B60K 6/08
[52] U.S. Cl. .......................................... 180/65.4; 180/68.2
[58] Field of Search ................................. 180/65.1, 65.3, 180/65.4, 65.6, 68.1, 68.2

[56] References Cited

U.S. PATENT DOCUMENTS

| | | | |
|---|---|---|---|
| 4,325,451 | 4/1982 | Umeda | 180/65.4 |
| 5,280,827 | 1/1994 | Taylor et al. | 180/65.3 |
| 5,432,413 | 7/1995 | Duke et al. | 180/65.4 |
| 5,722,502 | 3/1998 | Kubo | 180/65.4 |
| 5,746,283 | 5/1998 | Brighton | 180/65.4 |

OTHER PUBLICATIONS

Agarwal et al., Development of an Experimental AC Drive System for Off–Highway Vehicles, IAS Annual Meeting, pp. 320–328, Oct. 1980.

*Primary Examiner*—Lanna Mai
*Assistant Examiner*—Avraham H. Lerner

[57] ABSTRACT

A diesel motor-driven electric drive power train system including a diesel engine having a rotatable crankshaft from which a torquing force is output when the engine is energized; an electric generator having a rotatable rotor coupled to the crankshaft of the diesel engine and generating an output electrical current when rotated by the crankshaft; a vehicle frame coupled to the diesel engine and generator and having a wheel rotatably coupled thereto and with the wheel having a central axle shaft extended therefrom; an electric motor coupled to the axle shaft of the wheel for rotating the wheel when electrically energized; and a manually-actuatable three-position gear shift switch mechanism coupled between the generator and the motor and having a first position for energizing the motor to allow the wheel to turn in one direction, and a second position for energizing the motor to allow the wheel to turn in an opposite direction, and a third position for de-energizing the motor.

1 Claim, 4 Drawing Sheets

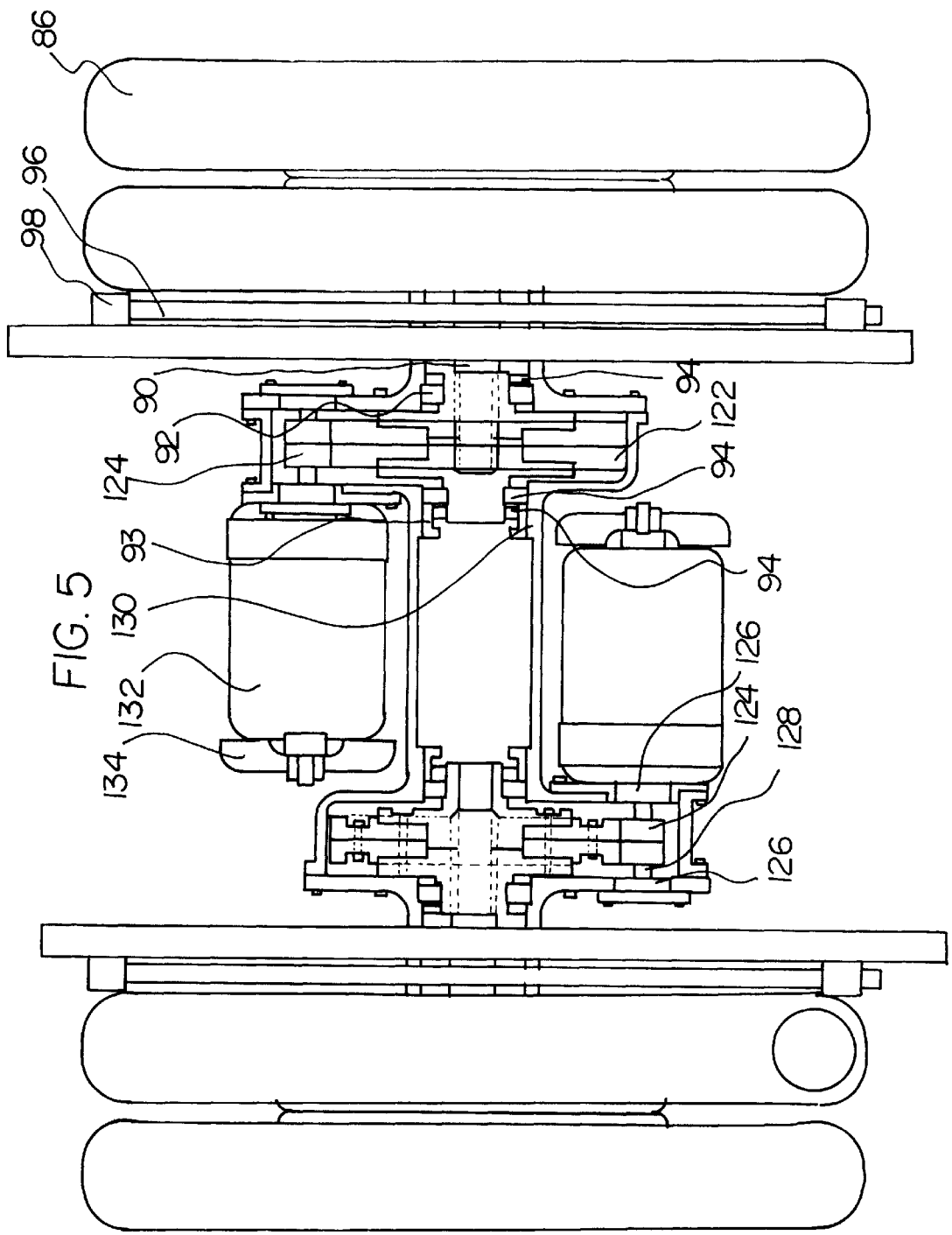

DIESEL MOTOR-DRIVEN ELECTRIC DRIVE POWER TRAIN SYSTEM

BACKGROUND OF THE INVENTION

1. Field of the Invention

The present invention relates to a diesel motor-driven electric drive power train system and more particularly pertains to propelling a vehicle with a diesel motor-driven electric drive power train system.

2. Description of the Prior Art

The use of power train systems is known in the prior art. More specifically, power train systems heretofore devised and utilized for the purpose of propelling a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,343,970 to Severinsky discloses a hybrid electric vehicle. U.S. Pat. No. 5,327,987 to Abdelnalek discloses a high efficiency hybrid car with gasoline engine and electric battery powered motor. U.S. Pat. No. 5,282,641 to McLaughlin discloses a truck/trailer control system. U.S. Pat. No. 5,230,402 to Clark et al. discloses an electric hydraulic car. U.S. Pat. No. 4,554,989 to Gruich et al. discloses a multi-motor modular electric drive power train system for turbine powered vehicles.

While these devices fulfill their respective, particular objective and requirements, the aforementioned patents do not describe a diesel motor-driven electric drive power train system that combines both diesel and supplemental electrical power in one integrated system and allows a driver to precisely control forward, rearward, or braking motion of each wheel of a vehicle with a simple gear shift switch.

In this respect, the diesel motor-driven electric drive power train system according to the present invention substantially departs from the conventional concepts and designs of the prior art, and in doing so provides an apparatus primarily developed for the purpose of propelling a vehicle.

Therefore, it can be appreciated that there exists a continuing need for new and improved diesel motor-driven electric drive power train system which can be used for propelling a vehicle. In this regard, the present invention substantially fulfills this need.

SUMMARY OF THE INVENTION

In the view of the foregoing disadvantages inherent in the known types of power train systems now present in the prior art, the present invention provides an improved diesel motor-driven electric drive power train system. As such, the general purpose of the present invention, which will be described subsequently in greater detail, is to provide a new and improved diesel motor-driven electric drive power train system and method which has all the advantages of the prior art and none of the disadvantages.

To attain this, the present invention essentially comprises, in combination, a diesel engine having a rotatable crankshaft from which a torquing force is output when the engine is energized. An electric generator is included and has a rotatable rotor coupled to the crankshaft of the diesel engine that generates an output electrical current when rotated by the crankshaft. The rotor of the generator also includes a fan with a plurality of blades coupled thereto. The rotor is rotated when a blowing force of air is placed upon the fan's blades. A vehicle frame is also provided and is coupled to the diesel engine and generator. The frame has a front pair of wheels and a rear pair of wheels rotatably coupled thereto and wherein each wheel has a central axle shaft.

Also included is an air duct assembly. The assembly has a pair of open input ends and a common open output end that is terminated at a location adjacent to the blades of the fan of the generator for directing air thereto when the vehicle frame is moving forward. An electric motor is provided and is coupled to the axle shaft of each wheel for rotating each wheel when electrically energized.

Lastly, a manually-actuatable three-position gear shift switch mechanism is included and coupled between the generator and the motors. The switch mechanism has a first position for energizing the motors to allow the wheels to turn in one direction for moving the vehicle frame forward, and a second position for energizing the motors to allow the wheels to turn in an opposite direction for moving the vehicle backward, and a third position for de-energizing the motors.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved diesel motor-driven electric drive power train system which has all the advantages of the prior art power train systems and none of the disadvantages.

It is another object of the present invention to provide a new and improved diesel motor-driven electric drive power train system which may be easily and efficiently manufactured and marketed.

It is a further object of the present invention to provide a new and improved diesel motor-driven electric drive power train system which is of durable and reliable construction.

An even further object of the present invention is to provide a new and improved diesel motor-driven electric drive power train system which is susceptible of a low cost of manufacture with regard to both materials and labor, and which accordingly is then susceptible of low prices of sale to the consuming public, thereby making such a diesel motor-driven electric drive power train system economically available to the buying public.

Still yet another object of the present invention is to provide a new and improved diesel motor-driven electric drive power train system which provides in the apparatuses and methods of the prior art some of the advantages thereof, while simultaneously overcoming some of the disadvantages normally associated therewith.

Even still another object of the present invention is to provide a new and improved diesel motor-driven electric drive power train system for propelling a vehicle.

Lastly, it is an object of the present invention to provide a new and improved diesel motor-driven electric drive power train system comprising a diesel engine having a rotatable crankshaft from which a torquing force is output when the engine is energized; an electric generator having a rotatable rotor coupled to the crankshaft of the diesel engine and generating an output electrical current when rotated by the crankshaft; a vehicle frame coupled to the diesel engine and generator and having a wheel rotatably coupled thereto and with the wheel having a central axle shaft extended therefrom; an electric motor coupled to the axle shaft of the wheel for rotating the wheel when electrically energized; and a manually-actuatable three-position gear shift switch mechanism coupled between the generator and the motor and having a first position for energizing the motor to allow the wheel to turn in one direction, and a second position for energizing the motor to allow the wheel to turn in an opposite direction, and a third position for de-energizing the motor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cross-sectional view of the present invention taken along the line 5—5 of FIG. 2.

The same reference numerals refer to the same parts through the various Figures.

DESCRIPTION OF THE PREFERRED EMBODIMENT

Figure 1:
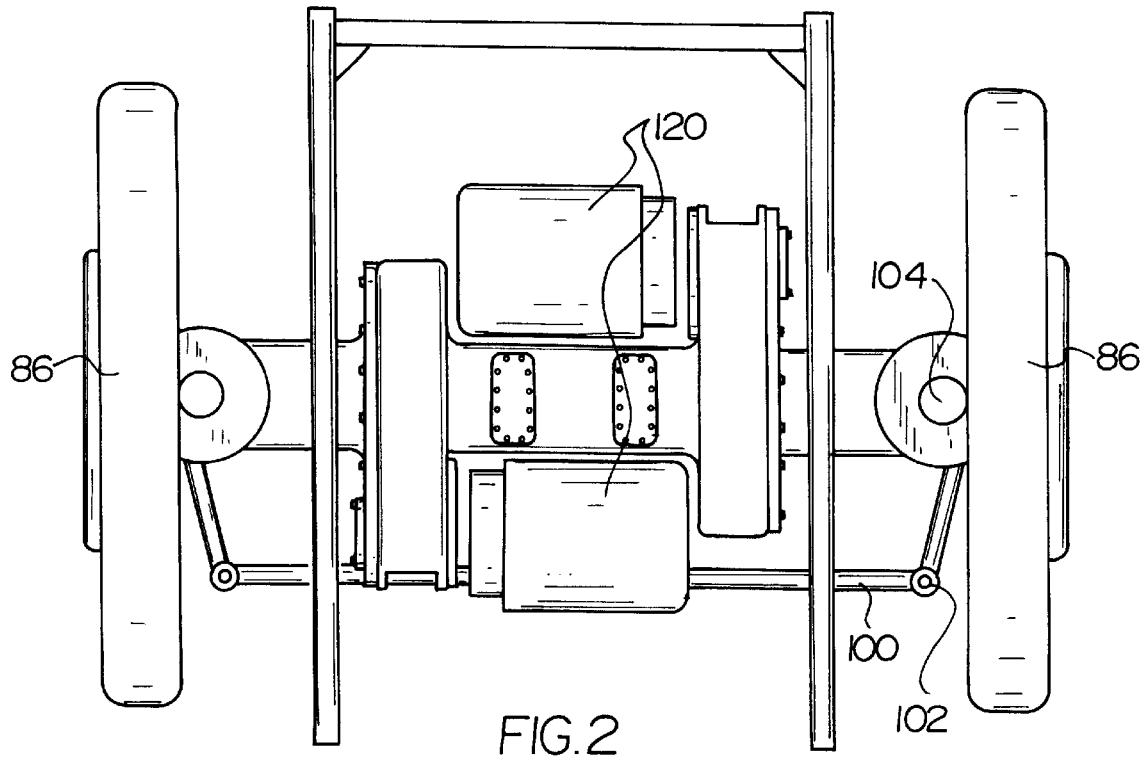
FIG. 1 is a plan view of a portion of the preferred embodiment of the present invention secured to the front wheels of a vehicle.
Figure 2:
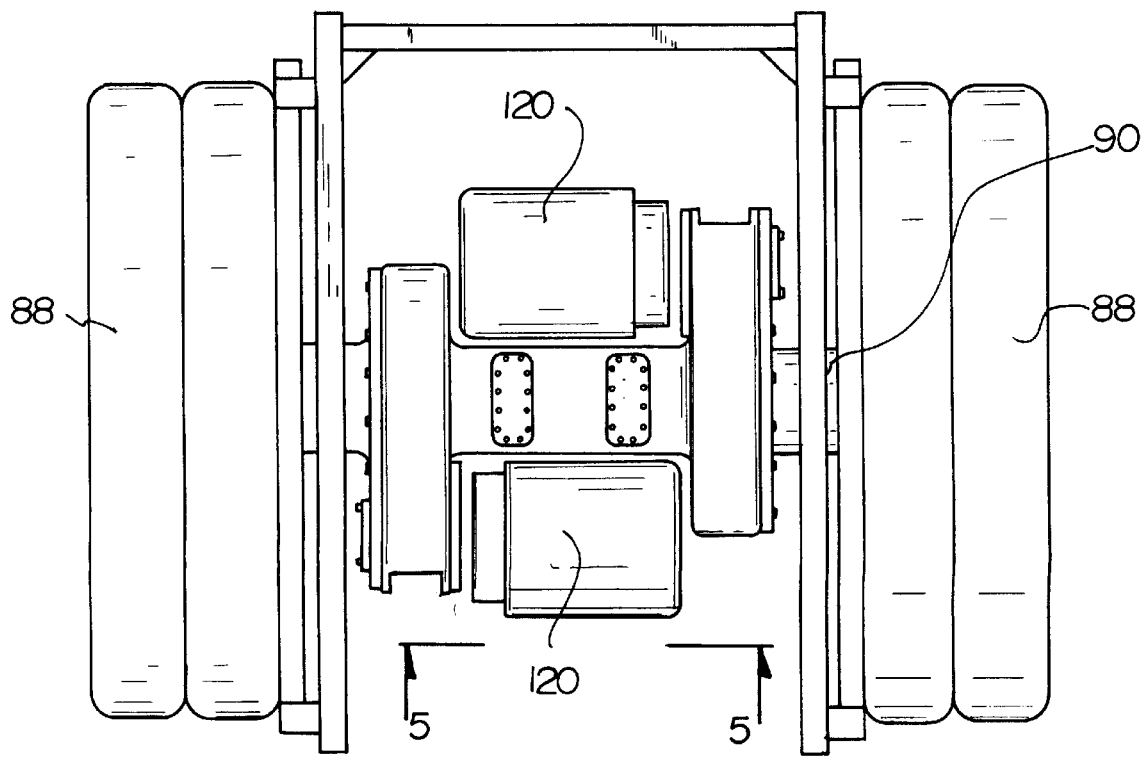
FIG. 2 is a plan view of another portion of the preferred embodiment of the present invention secured to the back wheels of a vehicle.
Figure 4:
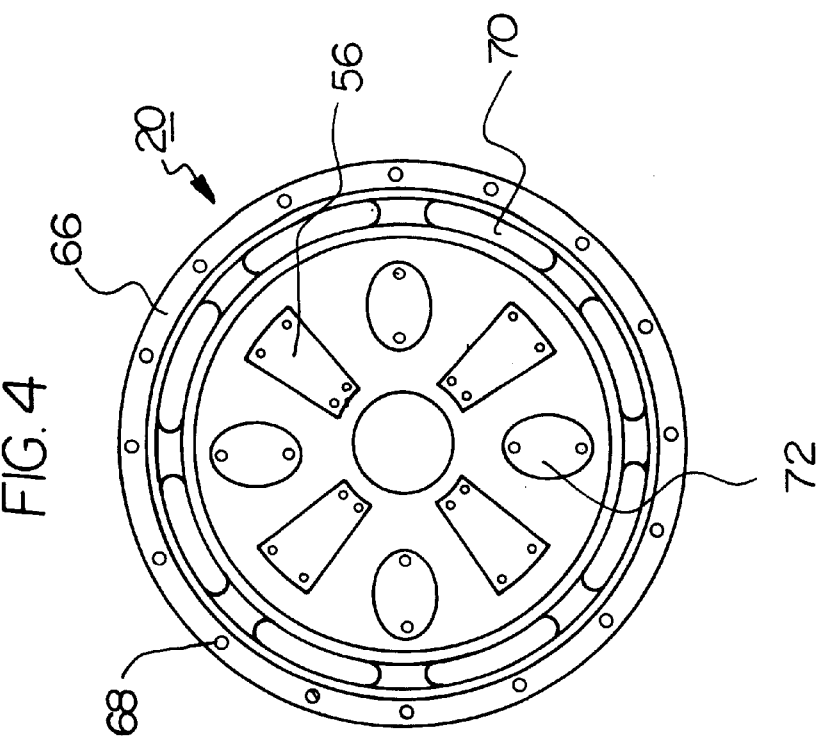
FIG. 4 is an rear view of the generator of the present invention.
Figure 3:
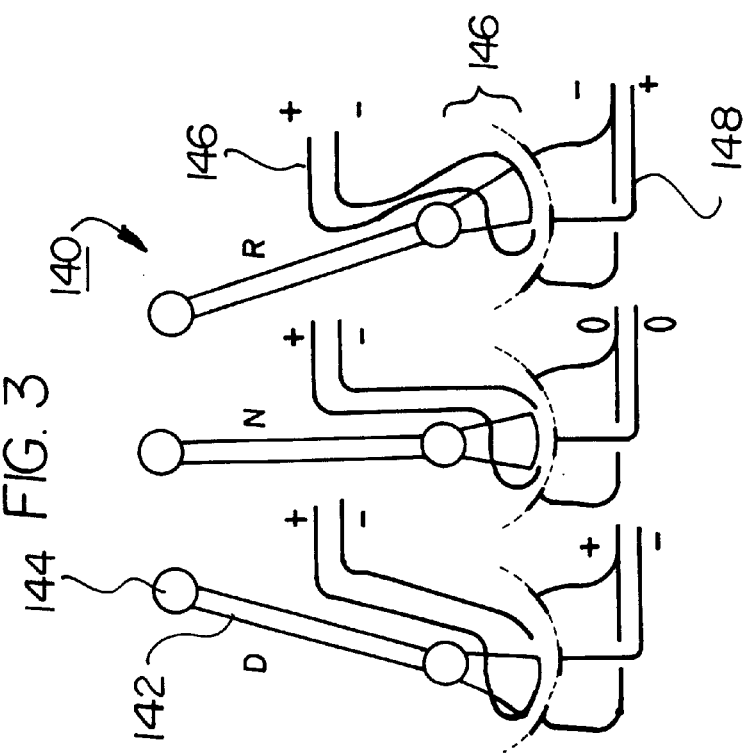
FIG. 3 is a side-elevational view of the gear shift switch mechanism of the present invention used for activating the wheels of the vehicle for forward motion, reverse motion, or neutral.
Figure 6:
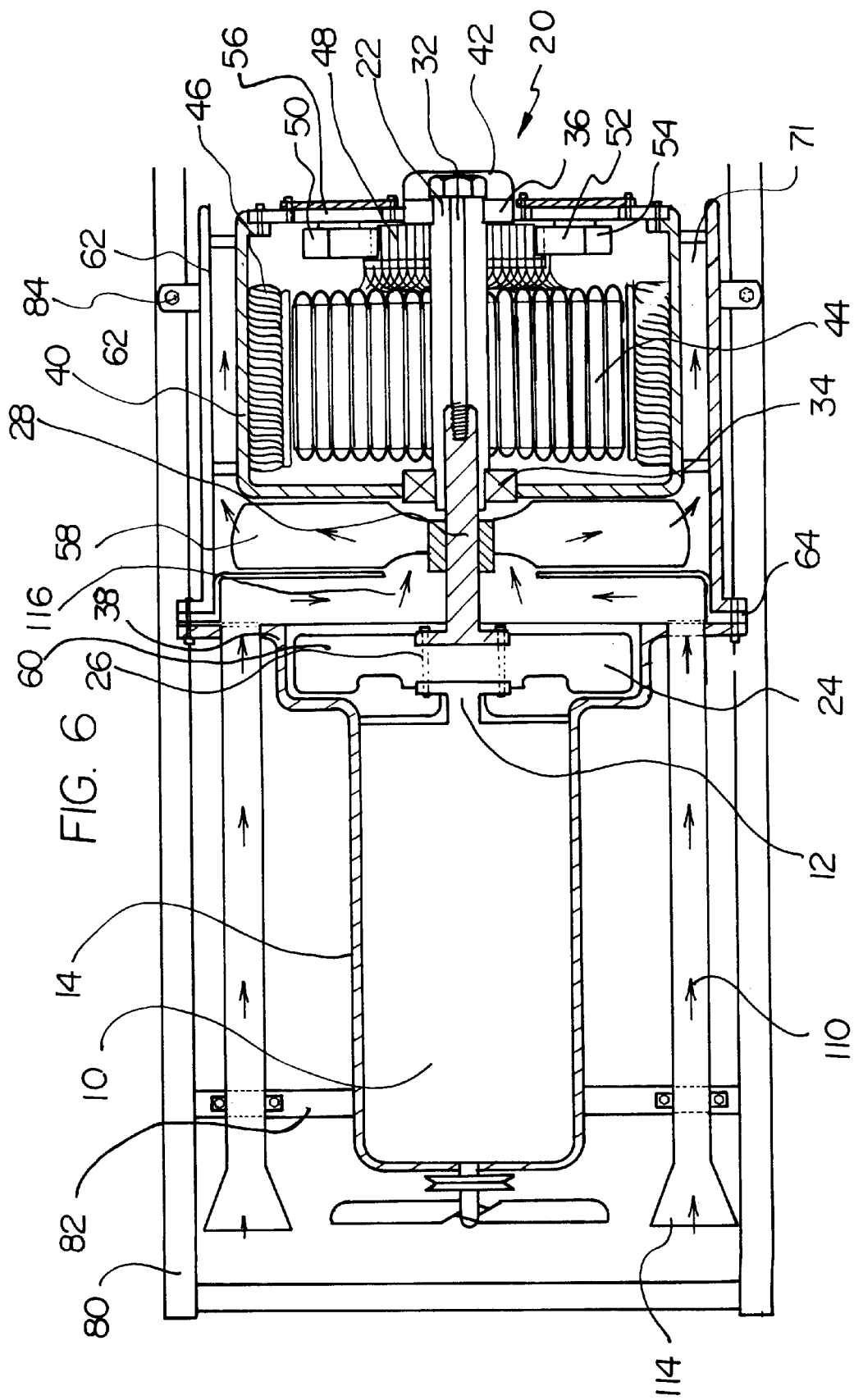
FIG. 6 is a cross-sectional view of the diesel engine and electric generator of the present invention.

With reference now to the drawings, and in particular, to FIGS. 1, 2, and 6 thereof, the preferred embodiment of the new and improved diesel motor-driven-electric drive power train system embodying the principles and concepts of the present invention will be described.

The preferred embodiment of the present invention is comprised of a plurality of components. In their broadest context, such components include a diesel engine, electric generator, vehicle frame with wheels, air duct assembly, electric motors, and gear shift switch mechanism. Such components are individually configured and correlated with respect to each other to provide the intended function of allowing a driver of a vehicle such as a truck to control the vehicle's forward or rearward motion.

Specifically, the present invention includes a diesel engine 10. The diesel engine is conventional in design and has a rotatable crankshaft 12 from which a torquing force is output when the engine is energized. The crankshaft extends outward from the back of the engine block 14.

In addition, the present invention includes an electric generator 20. The generator has a rotatable rotor 22 coupled to the crankshaft 12 of the diesel engine 10 with a flywheel 24 and associated bolts 26. The rotor is formed of a forwardly extending intermediate shaft 28 axially affixed to a rearward shaft 30 with a shaft bolt 32 that can be adjusted through its hexagonal head. The rotor is supported for rotation by a forward roller bearing 34 and a rearward roller bearing 36. The flywheel is shielded by a flywheel housing 38. The generator 20 is shielded by a generator block 40. The rotor is shielded from direct contact by a rearward cover 42. The generator is formed in a conventional fashion with a coiled rotor armature 44 in direct opposition to a stator 46. Electrical current is available for use from the collector 48 via linkage with the brushes 50, 52. Each brush is held by a bracket 54 and associated support 56. The generator generates an output electrical current when rotated by the crankshaft 12 of the diesel engine. The generator also has a fan 58 coupled to the rotor between the generator block 40 and diesel engine. The fan has a plurality of blades 60 that allow the rotor to be rotated when a blowing force of air is placed upon the fan's blades. Both the generator and fans are shielded by an outer cover 62 coupled to the flywheel housing 38 with bolts 64. The generator block is accessed through a removable cover plate 66 coupled to the block 40 with bolts 68. The cover plate has a plurality of air ducts 70 formed thereon to allow air to exit from side channels 71 when blown across the fan blades. The brushes 52 are accessible through removable brush covers 72.

A rigid metal vehicle frame 80 is coupled to the diesel engine 10 with a forward arm 82 and the generator 20 with a rearward arm 84. The vehicle frame is also provided with a front pair of wheels 86 and a rear pair of wheels 88, with the rear wheels being placed in a conventional dual-type configuration. Each wheel has a central axle shaft 90 extended therefrom and supported by a roller bearing 92. Lubrication for each axle is provided via oil gasket 94. Each rear wheel is rotatably coupled to the frame with a leaf spring 96 and associated spring bracket 98. The front wheels are coupled to the frame of a vehicle and turnable through a steering rod 100 and ball joint assembly 102. The steering rod and ball joint assembly is coupled to the wheel with a pivot bolt 104.

To provide air to the fan of the generator, an air duct assembly 110 is included. The air duct assembly has a pair of rigid metal open input ends 112 with flanged integral nozzles 114 positioned in a forwardly facing arrangement on each side of the diesel engine. The air duct assembly 110 is terminated at a common output end 116 in communication with the side channels 71 at a location adjacent to the blades 60 of the fan of the generator. The air duct assembly directs air to the fan when the vehicle frame is moving forward. Thus, an additional force for turning the rotor is provided to the fan blades as a supplement to that provided by the diesel engine. The input ends 112 of the air duct assembly are coupled to the forward arm 82 of the frame to hold them in place.

An electric motor 120 is coupled to an axle shaft 90 of each wheel. Each electric motor is conventional in design and is used for rotating each wheel when electrically energized. The coupling of the motor to each wheel is performed with a ring gear assembly 122, pinions 124, and gear bearings 126. Output power is supplied from the motor via a motor shaft 128. The assembly 112, pinions 124, gear bearing 128, and motor shaft 128 are encased in a rigid gear housing 130. Each motor is encased in a motor housing 132 and cooled by fan 134.

To manually actuate the present invention, a gear shift switch mechanism 140 is coupled between the generator and motors. The gear shift switch mechanism includes a manually-actuatable gear shift 142 with handle 144 and a three-position contactor 146. The contactor is connected to the motors and generators with conventional power cables 148. The switch mechanism 140 has a first position for energizing the motors to allow the wheels 86, 88 to turn in one direction for moving the vehicle frame forward. The switch mechanism also has a second position for energizing the motors to allow the wheels to turn in an opposite direction for moving the vehicle backward. Lastly, a third position is provided for de-energizing the motors.

The present invention includes a frame and drive mechanism for use with a vehicle and provides electric current for driving its wheels. The present invention is formulated such that there is no need for a clutch, gearbox, or associated shafts or differentials that are currently utilized in conventional vehicles such as trucks and trailers. Universal joints in the present invention would be reduced to two on the axle shafts of the front wheels to allow for turning. The present invention will be provided with a gear shift switch mechanism for use by a driver and is mounted on the floor of a passenger compartment of the vehicle. The gear shift switch mechanism activates a contact switch with three positions, with one being a forward position for forward motion, a middle position for neutral, and a backward position for rearward motion. The contact switch is be connected to the motors via conventional power cables. The motors have the capability of two phase operation; that is, they are able to supply torquing forces in either one direction or another. In the present invention, each wheel is coupled with a separate electrical motor receives electric current for operation through the manual operation of the gear shift. The gear shift be used to actuate forward motion or used as a brake. The three-position contact of the gear shift mechanism serves as a polarity transformer for the motors and thereby changes the driving sense of the truck, depending on the selection of the driver.

In operation, the diesel engine is actuated by a driver through a standard acceleration pedal. The diesel engine will spin the generator and in the same will activate a voltage regulator coupled between the generator and the motors to ensure a steady level of power to the motors. By supplying more acceleration force to the diesel engine, the crankshaft will spin faster, and power output to the wheels will via the electric motors increases in relative proportion. Thus, as the acceleration pedal is pushed, the power to the wheels will be progressively amplified via the generator. The generator has had a heavy duty coil armature and multiple brushes to supply the required appropriate power. The diesel engine of the present invention is conceived for providing output power in the range of 280–500 horsepower (HP). If the diesel engine is to be of 350 HP, as is the preferred embodiment, the generator will have to supply 257.60 kilowatts at 500 volts and 515.2 amperes. If the generator will be 257.60 kilowatts at 120 volts, then 2147 amperes are required. The rotational rapport between the electric engine and the propelling wheels is 1 multiplied by 6 or consequently 6×35 HP per 1 propelling wheel, which multiplied 10 times equals 2100 HP.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A diesel motor-driven electric drive power train system for propelling a vehicle forwardly and rearwardly in a path of travel comprising, in combination:

a diesel engine having a rotatable crankshaft from which a torquing force is output when the engine is energized, the crankshaft having an axis aligned with the path of travel;

an electric generator having a rotatable rotor coupled to the crankshaft of the diesel engine and generating an output electrical current when rotated by the crankshaft and with the rotor having a fan with a plurality of blades coupled thereto wherein the rotor is rotated when a blowing force of air is placed upon the fan's blades, the rotor having an axis axially aligned with the axis of the crankshaft;

a vehicle frame coupled to the diesel engine and generator and having a front pair of wheels and a rear pair of wheels rotatably coupled thereto and with each wheel having a central axle shaft extended therefrom, each wheel having an axis of rotation transverse of the axis of the crankshaft and rotor;

an air duct assembly having a pair of open input ends and a common open output end that is terminated at a location adjacent to the blades of the fan of the generator in proximity to the rotor for directing air thereto when the vehicle frame is moving forward;

an electric motor coupled to the axle shaft of each wheel for rotating each wheel when electrically energized; and manually-actuatable three-position gear shift switching means coupled between the generator and the motors and having a first position for energizing the motors to allow the wheels to turn in one direction for moving the vehicle frame forward, and a second position for energizing the motors to allow the wheels to turn in an opposite direction for moving the vehicle backward, and a third position for de-energizing the motors.

* * * * *